United States Patent [19]

Tanaka

[11] Patent Number: 5,553,044
[45] Date of Patent: Sep. 3, 1996

[54] OPTICAL RECORDING METHOD AND APPARATUS FOR ENABLING INTERCHANGE OF DISSIMILAR RECORDING MEDIA

[75] Inventor: Kunimaro Tanaka, Amagasaki, Japan

[73] Assignee: Mitsubishi Denki Kabushiki Kaisha, Tokyo, Japan

[21] Appl. No.: 196,998

[22] Filed: Feb. 15, 1994

Related U.S. Application Data

[63] Continuation of Ser. No. 694,146, May 1, 1991, abandoned.

[30] Foreign Application Priority Data

| May 16, 1990 | [JP] | Japan | 2-127686 |
| Oct. 25, 1990 | [JP] | Japan | 2-290466 |

[51] Int. Cl.⁶ .................................................. G11B 7/00
[52] U.S. Cl. .......................... 369/58; 369/13; 369/48; 369/54; 369/116
[58] Field of Search ............................ 369/47, 48, 58, 369/54, 116, 121, 13, 275.1, 275.3, 50, 49; 360/114, 59

[56] References Cited

U.S. PATENT DOCUMENTS

| 4,554,651 | 11/1985 | Kanai et al. | 369/13 |
| 4,688,203 | 8/1987 | Koishi et al. | 369/48 |
| 4,698,695 | 10/1987 | Kosaka et al. | 369/48 |
| 4,878,132 | 10/1989 | Aratani et al. | 369/13 |
| 4,908,809 | 3/1990 | Tadokoro et al. | 369/13 |
| 5,003,521 | 3/1991 | Yoshida et al. | 369/54 |
| 5,016,232 | 5/1991 | Tadokoro et al. | 369/13 |
| 5,058,092 | 10/1991 | Miyasaka | 369/58 |
| 5,107,482 | 4/1992 | Goto et al. | 369/116 |
| 5,132,945 | 7/1992 | Osato et al. | 360/59 |
| 5,155,722 | 10/1992 | Yoshida | 369/116 |
| 5,289,451 | 2/1994 | Ashinuma et al. | 369/54 |

FOREIGN PATENT DOCUMENTS

| 0081138 | 6/1983 | European Pat. Off. . | |
| 3830745 | 3/1989 | Germany . | |
| 0060742 | 4/1984 | Japan | 369/54 |
| 0260439 | 11/1986 | Japan | 369/13 |
| 0237238 | 10/1988 | Japan | 369/13 |
| 0241051 | 9/1989 | Japan | 369/13 |
| 133914 | 8/1984 | United Kingdom | 369/13 |

*Primary Examiner*—Aristotelis Psitos
*Assistant Examiner*—Thang V. Tran
*Attorney, Agent, or Firm*—Wolf, Greenfield & Sacks, P.C.

[57] ABSTRACT

An optical recording medium and apparatus discriminates media of a direct overwrite light modulation type from media which are not of the direct overwrite light modulation type. The apparatus adapts both light power used for recording and erasing and recording method according to the medium type discriminated. A method of using both direct overwrite optical recording media at non-direct overwrite optical recording media in a single apparatus includes steps of writing control information onto a medium, including an indication of the type of overwrite operation and power levels appropriate to the medium, and adapting the recording apparatus to use the appropriate recording method and power levels for the medium type detected.

11 Claims, 5 Drawing Sheets

OPTICAL RECORDING METHOD AND APPARATUS FOR ENABLING INTERCHANGE OF DISSIMILAR RECORDING MEDIA

This is a continuation, of application Ser. No. 07/694,146, filed May 1, 1991 now abandoned.

BACKGROUND OF THE INVENTION

1. Field of the Invention

The present invention relates to optical recording media such as an optical disc, an optical-magnetic disc and a phase-change optical disc conforming to ISO standards, and an optical recording apparatus for recording information therein, particularly, it relates to an optical recording medium in which a direct overwrite is possible by the light modulation, and an optical recording apparatus capable of recording information therein by various recording formats including a direct overwrite recording format.

2. Description of Related Art

In a 130 mm optical disc standardized by ISO, a region called a control track is arranged on its inner and outer circumferences (ISO/IEC DIS 10089). In an annular part between 29 and 29.5 mm in radius of the control track on the inner circumferential side, a region called a Phase Encoded Part, hereinafter abbreviated as PEP, and in annular parts between radii 29.52 and 29.7 mm in radius on the inner circumferential side and between 60.15 and 60.5 mm in radius on the outer circumferential side of the control track, standard Format Parts, hereinafter abbreviated as SFP, are provided respectively.

In the PEP, there are no track grooves and, unlike the user's region, information are recorded at low density. This is for reproducing the medium of various characteristics without errors. In the PEP, information for reading the type and SFP of the optical disc are recorded by phase codes. In the PEP, 3 sets, each set consisting of 18 bytes from byte 0 to 17, are recorded in one circuit. In upper 4 bits of the byte 7 of the PEP, a type of the optical disc is recorded, and when the bit 5 is "1" it shows that the optical disc is a postscript type.

The SFP has track grooves, wherein various conditions for recording and reproducing the optical disc are recorded at the same density as the user's region. There are regions of 512 bytes in the SFP altogether, in which reproduced information of the PEP are recorded in the 18 bytes from byte 0 to 17, media information such as recording and reproducing conditions of the optical disc are recorded in the 366 bytes from byte 18 to 383, and system information such as the number of bytes of the user's region are recorded in the 64 bytes from byte 384 to 447. Byte 448 to 511 are reserved as regions for the future standardization or for another standard.

In the region of the SFP where the media information are recorded, respective conditions of the reflectance and the light power with respect to three kinds of laser wavelengths are prescribed.

The light power is prescribed respectively for four kinds of rotational frequency of the disc with respect to the respective wavelengths, so twelve kinds of light power are prescribed altogether. Furthermore, for respective twelve kinds of conditions, a total of nine kinds of light power, three kinds of recording radius and three kinds of pulse width, are prescribed in case of the fixed pulse width process, and a total of four kinds of conditions, the light power and the pulse of three kinds of radius are prescribed in case of the fixed power process, thus a total of 13 kinds of conditions are prescribed. Accordingly, a very large quantity of condition data of the light power of 156 kinds, 13×12, are recorded as one byte per one kind.

Similarly, since condition data for erasing are also stored in the media information region of the SFP by the same bytes as for recording, a total of 312 bytes of the condition data in connection with the light power are stored.

Recently, a rewritable optical disc such as an optical-magnetic disc, which can be over-written directly (direct overwritable) with one beam by the light modulation or the magnetic field modulation is proposed. This has been developed to delete the rotation waiting time at erasing the optical-magnetic disc and to speed up the accessing speed. In a magnetic field modulation type, a direction of magnetization is fixed forcibly corresponding to the binary signal as in a magnetic disc apparatus, in which one kind of light power is enough for the recording. On the other hand, in a light modulation type, a plurality of magnetic layers are formed on the optical-magnetic disc, and two kinds of light power are changed corresponding to the binary signal for the recording.

Also the optical disc of phase-change type which can be directly overwritten with one beam by the light modulation similarly using two kinds of light power corresponding to the binary signal is proposed.

FIG. 1(a–c) is a conceptual view of the recording operation of a conventional direct overwrite type optical-magnetic disc.

The optical-magnetic disc (hereinafter referred to as a disc) 1 is composed of a first magnetic layer 22 which has a vertical magnetic anisotropy and whose direction of magnetization is reversible and which is provided on a substrate 21, for example, consisting of glass, and a second magnetic layer 23 which has the vertical magnetic anisotropy and is magnetized in one direction and whose direction of magnetization is not reversible under the same condition as the first magneticlayer 22 and which is provided on the first magnetic layer 22. The second magnetic layer 23 of the disc 1 shown in FIG. 1(b) is magnetized in the opposite direction of the substrate 21 or upwardly.

Next, the operation of overwriting and recording information in the disc 1 will be described.

First, in case of overwriting the information by recording signals PD of "1" and "0" shown in FIG. 1(a) in the disc 1 in which the direction of magnetization of the second magnetic layer 23 is in the opposite direction of the substrate 21 as shown in FIG. 1(b), the disc 1 is rotated and, at the same time, an external magnetic field +H directing downward as shown by the block arrow which is opposite to the magnetization direction of the second magnetic layer 23 thereof is given. Then, while the recording signal is "1", a light beam LB of the high output PH in the projecting direction shown by the white arrow is projected on the first magnetic layer 22 as shown in FIG. 1(c). When the first magnetic layer 22 is heated by the light beam LB and its temperature reaches Curie temperature, the magnetization direction of the first magnetic layer 22 aligns in the same direction as the external magnetic field +H or the direction of the substrate 21, and when the light beam LB is not projected due to the rotation of the disc 1, and the temperature of the first magnetic layer 22 drops, the first magnetic layer 22 is magnetized in the direction of the substrate 21 to record information "1". While recording signal is "0", the light beam LB of the low output PL is projected on the first magnetic layer 22, as shown in FIG. 1(c). Thereby, the coercive force of the first magnetic layer 22 is lowered and aligned in the same direction as the magnetization direction of the second magnetic layer 23, or magnetized in the opposite direction of the substrate 21 to record information "0".

Thereby, no matter what information is recorded beforehand, the direct overwrite is possible.

As such, as for the rewritable optical disc, there are a recording format by which an optical disc is recorded after being erased and a direct overwritable recording format by which it is recorded by two levels of high and low light power.

The optical disc stated above in which the overwrite is possible by the light modulation is still in the development stage and is not standardized by ISO. In case of its standardization, since there are two levels of high and low light power, when it is applied in the aforesaid standard, another combinations of 156 kinds are still necessary, when including the erasing, a total of 468 kinds, 156×3, of combinations are necessary. Accordingly, 468 bytes are required as the storing capacity for condition data, and they can not be stored in the media information region of 366 bytes of the ISO standard.

This is true for the optical disc of 90 mm which is now under way of standardization by ISO. Though a region prescribing the light power in the control track is not decided, there is no space to store three kinds of condition data.

As for the rewritable optical disc, since there are two kinds of recording formats as stated above, in the past, it was necessary to record by using the different optical recording apparatus corresponding to the recording format. Accordingly, when the user wants to record by the different recording format, the optical recording apparatus corresponding to the respective recording formats should be prepared.

SUMMARY OF THE INVENTION

The present invention has been devised in view of such circumstances, therefore, it is a primary object thereof to provide an optical recording medium which is capable of recording the light power in a recording region with the same capacity whether or not the overwrite by the light modulation is possible, by recording information whether or not the optical recording medium is a direct overwrite light modulation recording medium as discriminating information in a PEP of a control track, and by recording two kinds of light power in response to the discriminating information in the same region of an SFP of the control track.

It is another object of the present invention to provide an optical recording apparatus which is capable of recording without errors and has an exchangeability, even when the optical recording medium has a different recording format, by checking whether or not the optical recording medium is the direct overwrite light modulation recording medium in response to the discriminating information recorded in the control track.

The above and further objects and features of the invention will more fully be apparent from the following detailed description with accompanying drawings.

DESCRIPTION OF THE PREFERRED EMBODIMENTS

In the following, the present invention will be described with reference to the drawings showing its embodiments.

Figure 2:
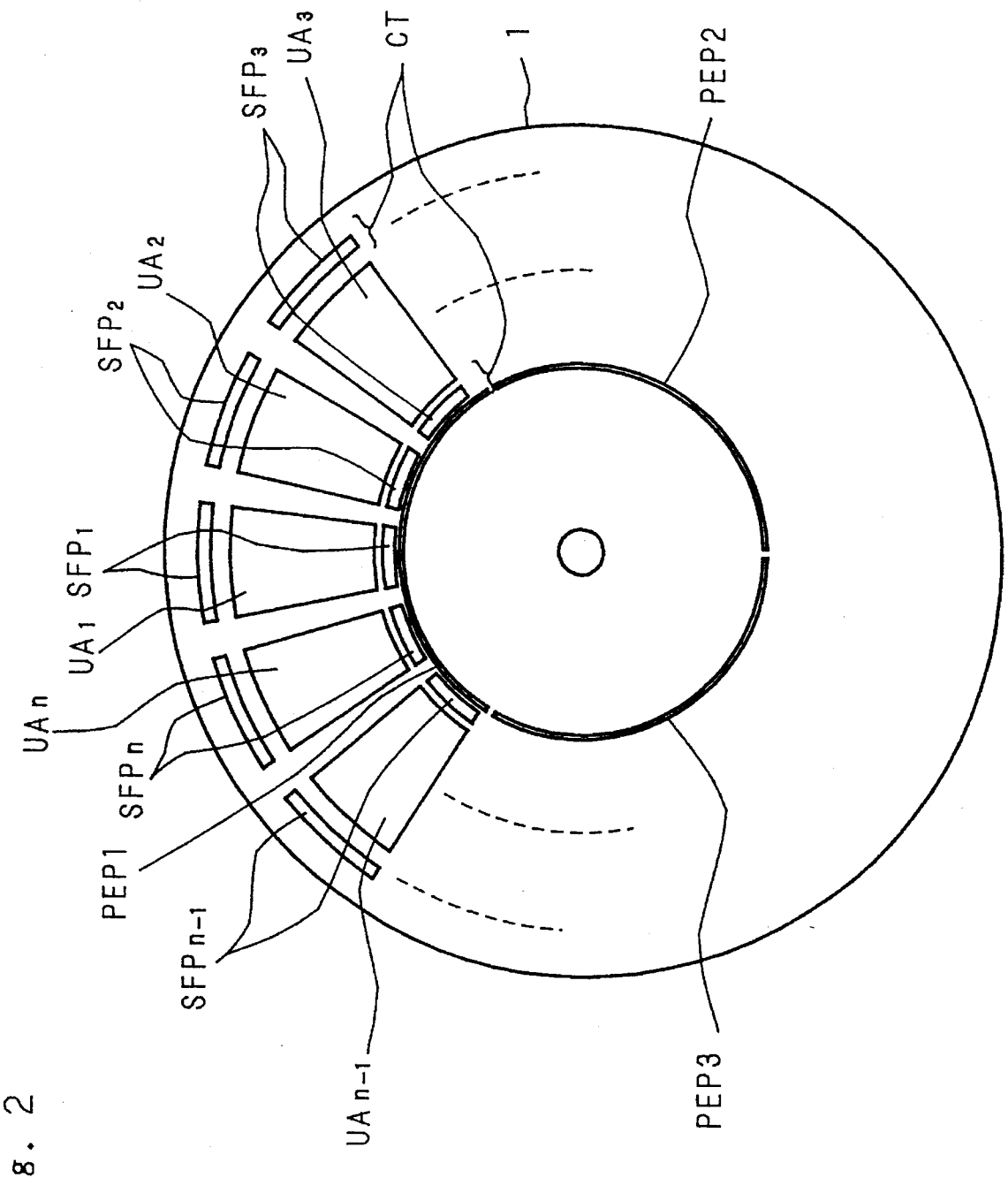
FIG. 2 is a view showing an area configuration of an optical-magnetic disc, FIG. 3(a, b) is a sectional view showing an optical-magnetic disc having a four-layer structure.

FIG. 2 is a plan view showing an area configuration of an optical-magnetic disc of 130 mm which is an optical recording medium according to the present invention. In the figure, numeral 1 designates the optical-magnetic disc having a two-layer structure in which a direct overwrite by the light modulation is possible. In inner and outer circumferences of the optical-magnetic disc 1, there are provided control tracks CT in which control information are recorded. In an annular region between 29 and 29.5 mm in radius of the inner control track CT, three phased encoded parts PEP1, PEP2, PEP3 of 18-byte length are preformatted.

In the phased encoded parts PEP1 to PEP3, track grooves are not provided and information are preformatted in triple printing by phase codes. In these parts, discriminating information showing the medium format such as whether the medium is a direct overwrite light modulation type or not, and information for reading the standard format parts to be described later are recorded. Details are substantially similar to those shown in Table 1 of 16. 4. 3. 2. on page 42 of ISO/IEC DIS 10089, so the description will be omitted. The kinds of media are recorded in the byte 7, and, for example, in case of the direct overwrite light modulation type, a predetermined bit shows "1".

In an annular region between 29, 52 and 29, 70 mm in radius following the phased encoded parts PEP1 to PEP3 of the control track CT, standard format parts SFP1 to SFPn (n: number of sectors) are preformatted by every sector, and recording and reproducing conditions and so on are recorded therein in the standard user data format. Here, the sector represents the track which is divided equally in a circumferential direction, and, for example, the number of sector n is set to 17 or 31 in ISO. In case the number of sector is 17, there are 1024 bytes in one sector of the user's data area and in case the number of sector is 31, there are 512 bytes. In the respective standard format parts SFP1 to SFPn, 512 bytes data from byte 0 to 511 are stored, wherein from bytes 0 to 17 the content of the phased encoded parts PEP1 to PEP3 are reproduced, and in the 342 bytes from bytes 18 to 359, information of two kinds of value of the write power (light power) with respect to three combinations of the wavelength and reflectance, four kinds of rotational frequency (N1 to N4), three kinds of radius (30 mm, 45 mm, 60 mm) and three kinds of pulse width (T×1.0, T×0.5, T×0.25) are recorded. Table 1 shows storing bytes of the standard format parts of the light modulation type optical recording medium at wavelength L1, reflectance R1, rotational frequency N1 and read power P1.

TABLE 1

| WAVELENGTH $L_1$ | REFLECTANCE $R_1$ | ROTATIONAL FREQUENCY $N_1$ | READ POWER $P_1$ | WRITE CONDITION 1 | | WRITE CONDITION 2 | |
| --- | --- | --- | --- | --- | --- | --- | --- |
| 18 | 19 | 20 | 21 | | | | |
| | | | | 1st WRITE POWER | | 2nd WRITE POWER | |
| | | | | $PW_{11}$ | T = 1 | $PW_{21}$ | T = 1 |
| | | | | RADIUS 30 | 22 | RADIUS 30 | 35 |
| | | | | RADIUS 45 | 23 | RADIUS 45 | 36 |
| | | | | RADIUS 60 | 24 | RADIUS 60 | 37 |
| | | | | 1st WRITE POWER | | 2nd WRITE POWER | |
| | | | | $PW_{12}$ | T = 0.5 | $PW_{22}$ | T = 0.5 |
| | | | | RADIUS 30 | 25 | RADIUS 30 | 38 |
| | | | | RADIUS 45 | 26 | RADIUS 45 | 39 |
| | | | | RADIUS 60 | 27 | RADIUS 60 | 40 |
| | | | | 1st WRITE POWER | | 2nd WRITE POWER | |
| | | | | $PW_{13}$ | T = 0.25 | $PW_{23}$ | T = 0.25 |
| | | | | RADIUS 30 | 28 | RADIUS 30 | 41 |
| | | | | RADIUS 45 | 29 | RADIUS 45 | 42 |
| | | | | RADIUS 60 | 30 | RADIUS 60 | 43 |
| | | | | CONSTANT WRITE POWER | | CONSTANT WRITE POWER | |
| | | | | $PW_{C1}$ | 31 | $PW_{C2}$ | 44 |
| | | | | WRITE PULSE WIDTH $T_{P1}$ | | WRITE PULSE WIDTH $T_{P2}$ | |
| | | | | RADIUS 30 | 32 | RADIUS 30 | 45 |
| | | | | RADIUS 45 | 33 | RADIUS 45 | 46 |
| | | | | RADIUS 60 | 34 | RADIUS 60 | 47 |

T: DURATION OF 1 CHANEL BEAT

That is, in the 26 bytes from byte 22 to 47, recording conditions 1, 2 of two kinds of high and low write power having the different light powers are recorded. With respect to these conditions, there are twelve combination, three kinds of wavelength and four kinds of rotational frequency, so for one kind of wavelength there is 104 bytes recording capacity and a total of 312 bytes recording capacity for all kinds.

While, in the non-direct overwrite light modulation type, in place of the second write power, an erase power is recorded. This is as stated in Table 2 on Page 50 of ISO/IEC DIS 10089, so its description will be omitted.

The annular region between 30 and 60 mm in radius following the standard format parts SFP1 to SFP3 is the user's data areas UA to UAn of n sectors or the 2-layer recording regions to be described later wherein the direct overwrite is possible.

In the annular region between 60.15 and 60.5 mm in radius of the outer control track CT, the standard format parts SFP1 to SPPn whose contents are the same as the standard format parts SFP1 to SFPn provided on the inner circumference side are provided.

The recording operation in the user's data areas UA1 to UAn will be described with refererence to FIG. 1.

The optical-magnetic disc 1 is composed of a first a magnetic layer 22 which has a vertical magnetic anisotropy and whose direction of magnetization is reversible and which is provided on a substrate 21, for example, consisting of glass, and a second magnetic layer 23 which has the vertical magnetic anisotropy and is magnetized in one direction and whose direction of magnetization is not reversible under the same condition as the first magnetic layer 22 and which is provided on the first magnetic layer 22. The second magnetic layer 23 of the optical-magnetic disc 1 shown in FIG. 1(b) is magnetized in the opposite direction of the substrate 21 or upwardly.

Next, the operation of overwriting information in the optical magnetic disc 1 will be described.

Figure 1A:
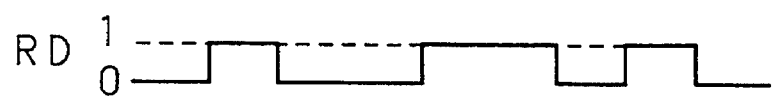
FIG. 1(a–c) is a conceptional view of a conventional direct overwrite recording operation.
Figure 1B:
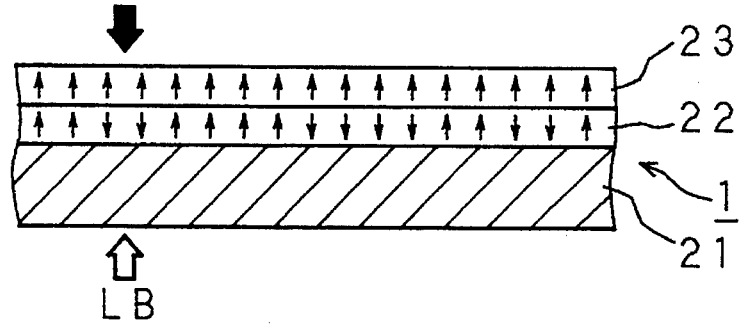
Figure 1C:
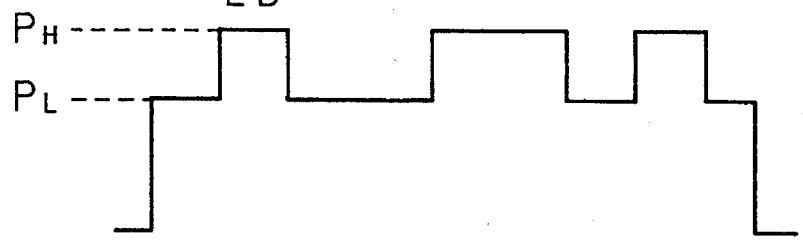

First, in case of overwriting the information by recording signals PD of "1" and "0" shown in FIG. 1(a), in the optical-magnetic disc 1 in which the direction of magnetization of the second magnetic layer 23 is in the opposite direction of the substrate 21 as shown in FIG. 1(b), the optical-magnetic disc 1 is rotated, at the same time, an external magnetic field +H directing downward as shown by the black arrow which is opposite to the magnetizing direction of the second magnetic layer 23 thereof is given. When, while the recording signal is "1", a light beam LB of the high output PH in the projecting direction shown by the white arrow is projected on the first magnetic layer 22, as shown in FIG. 1(c). When the first magnetic layer 22 is heated by the light beam LB and its temperature reaches Curie temperature, the magnetizing direction of the first magnetic layer 22 aligns in the same direction as the external magnetic field +H or in the direction of the substrate 21, when the light beam LB is not projected due to the rotation of the optical-magnetic disc 1, and the temperature of the first magnetic layer 22 drops, the first magnetic layer 22 is magnetized in the direction of the substrate 21 to record information "1". while the recording signal is "0", the light beam LB of the low output PL is projected on the first magnetic layer 22 as shown in FIG. 1(c). Thereby, the coercive force of the first magnetic layer 22 is lowered and aligned in the same direction as the magnetizing direction of the second magnetic layer 23, or magnetized in the opposite direction of the substrate 21 to record information "0".

Thereby, no matter what information is recorded beforehand, the direct overwrite is possible.

Write powers of such two levels of high and low outputs PH, PL are recorded in the standard format parts SFP1 to SFPn as the recording conditions 1, 2.

In case of the optical disc which is recorded with one kind of output level, the storing bytes are as shown in Table 2 on Page 50 of ISO/IEC DIS 10089, wherein erase conditions are written in a column of the second write power, at the same time, in the byte 7 of the phased encoded parts PEP1 to PEP3, information showing the fact (e.g. uppermost bit="0") is recorded.

By recording such a format in the optical recording medium, in optical recording medium driving means for accessing thereof, first the optical recording medium format is discriminated by information of the phased encoded parts PEP1 to PEP3, and in case of the direct overwrite light modulation optical recording medium, recording conditions 1, 2 are read, and in case of the non-direct overwrite optical recording medium, the recording and the erasing conditions are read and the user's data areas UA1 to UAn are accessed with the output conforming to respective conditions.

In this embodiment, though a two-layer optical-magnetic disc of 130 mm has been cited as an optical recording medium, the present invention is not limited thereto, it is to be understood that the present invention is also applicable in the other light modulation type optical recording media such as a multi-layer optical-magnetic disc and a phase-change optical disc and the like.

Figure 3:
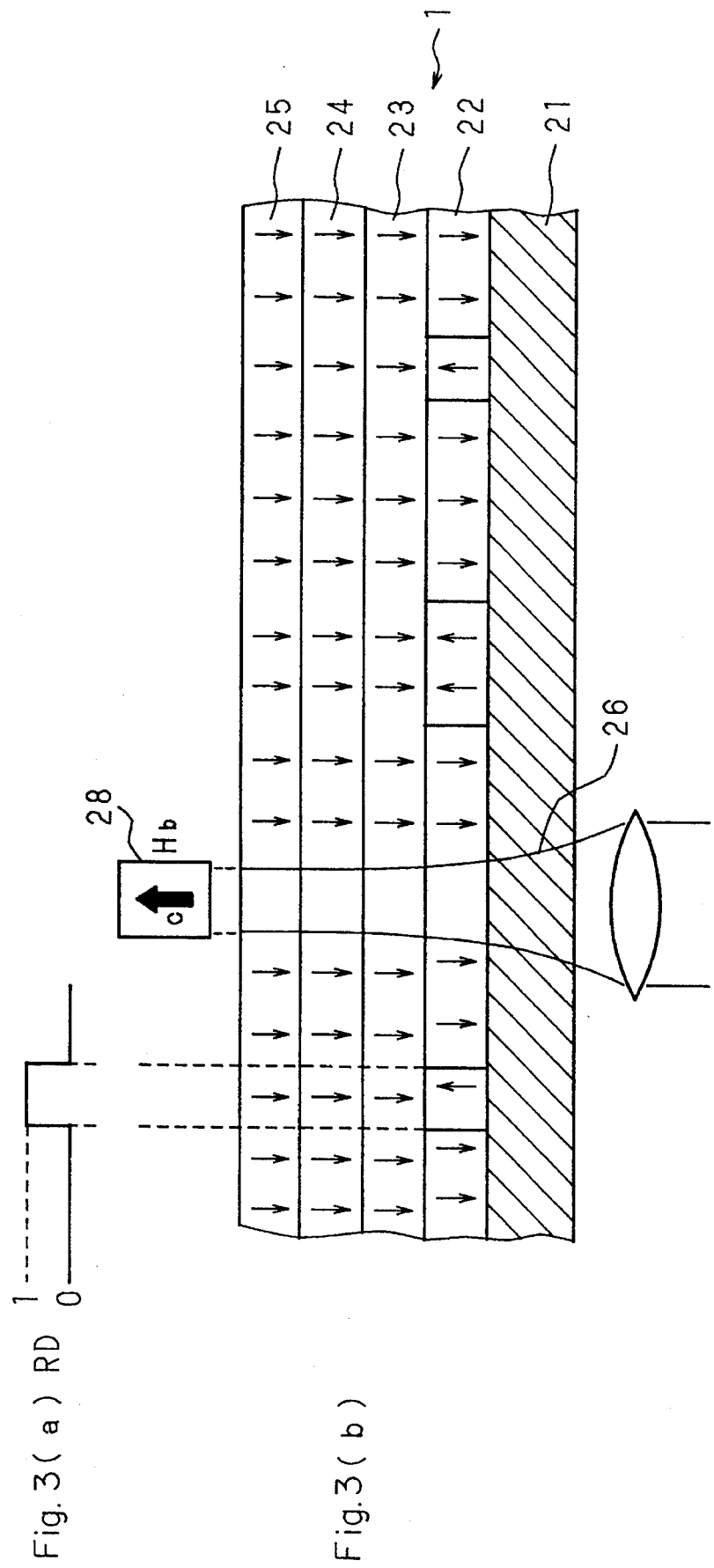

FIG. 3 is a sectional view showing the configuration and operation of a 4-layer optical disc. The optical disc is composed of a first magnetic layer 22 having a vertical magnetic anisotropy provided on a substrate 21 made of glass, a second magnetic layer 23 provided on the first magnetic layer 22 and coupled with it by the exchange coupling force, a third magnetic layer 24 provided on the second magnetic layer 23 and coupled with it by the exchange coupling force and a fourth magnetic layer 25 provided on the third magnetic layer 24 and coupled with it by the exchange coupling force.

Curie Temperatures of respective magnetic layers satisfy, $$T_{C1} < T_{C2}, \; T_{C3} < T_{C2}, \; T_{C1} < T_{C4}, \; T_{C3} < T_{C4},$$

where, $T_{C1}$: Curie temperature of the first magnetic layer
$T_{C2}$: Curie temperature of the second magnetic layer
$T_{C3}$: Curie temperature of the third magnetic layer
$T_{C4}$: Curie temperature of the fourth magnetic layer and, at room temperature, satisfy $H_{C1} > H_{W1}(2)$, $H_{C4} > H_4(3)$, and furthermore, between the room temperature and the lower temperature of $T_{C1}$ and $T_{C3}$ satisfy $$H_{C2} < H_{W2}(3) - H_{W2}(1), \; H_{C3} < H_{W3}(4) - H_{W3}(2)$$

where, $H_{C1}$: coercive force of the first magnetic layer
$H_{C2}$: coercive force of the second magnetic layer
$H_{C3}$: coercive force of the third magnetic layer
$H_{C4}$: coercive force of the fourth magnetic layer
$H_{Wi(j)}$: shift volume of the reverse magnetic field of the ith layer by the exchange coupling force exerted between the jth and ith layers.

When the alloy composition of rare earth-transition metal is selected for the first layer 22 to the fourth layer 25, the direction and magnitude of magnetization of each alloy appeared on the surface are determined by the relationship between the direction and magnitude of sub-lattice magnetization (magnetic moment per unit volume) of the transition metal atoms (hereinafter abbreviated as TM) in the alloy and those of the sub-lattice magnetization of rare earth metal (hereinafter abbreviated as RE). For example, the direction and magnitude of the sub-lattice magnetization of the TM are represented by the dot-line vector ↑, those of the sub-lattice magnetization of the RE by the solid-line vector ↑ and those of the magnetization of the entire alloy by the double solid-line vector ⇑. At this time, the vector ⇑ is represented as a sum of the vector ↑ and the vector ↑. However, in the alloy, the vector ↑ and the vector ↑ are always in the opposite direction due to the mutual action between the TM sub-lattice magnetization and the RE sub-lattice magnetization. Accordingly, the sum of ↓ and ↑ or the sum of ↓ and ↓ is zero when their magnitudes are equal (that is, the magnitude of magnetization appeared on the surface is Zero).

The alloy composition at this zero is called a compensation composition. In the other composition, the alloy has the strength equal to the difference of magnitude of the two sub-lattice magnetizations and is in the same direction (⇑ or ⇓) as that of the larger vector of the two. Magnetization of this vector is appeared on the surface. For example, ↑↓ makes ⇑ and ↑↓ makes ⇓.

When in a certain alloy composition either the magnitude of vector of the TM sub-lattice magnetization or that of the RE sub-lattice magnetization is larger, the alloy composition is referred to as, for example, an RE rich composition taking the name of sub-lattice magnetization of the larger magnitude. The first magnetic layer 22 to the fourth magnetic layer 25 are classified into TM rich compositions and the RE rich compositions.

Next, the operation will be described. When the laser output has been raised since the beginning of reproducing and the temperature in a portion of focusing spot 26 exceeds reference temperature but does not reach the magnetization reverse temperature, at which the coercive force is smaller than the external magnetic field and the magnetization reverses in the external magnetizing direction, of the second magnetic layer 23, the TM and RE sub-lattice magnetizing direction of the second magnetic layer 23 is not changed and at reference temperature of the first magnetic layer 22, the magnetizing direction of the second magnetic layer 23 is transferred on the first magnetic layer 22, whose TM sub-lattice magnetizing direction is directed downward. At reference temperature, the first magnetic layer 22 is TM rich (low recording). At this time, since the third magnetic layer 24 and the fourth magnetic layer 25 have nothing in particular to do with the operation, even when the magnetization of the third magnetic layer 24 is vanished, the magnetization is generated in the fixed direction again in the same direction as before, by the exchange coupling forth with the fourth magnetic layer 25. Thereafter, since the portion is away from the focusing spot 26, it is cooled to near the room temperature and the first magnetic layer 22 returns to the compensation composition. When the temperature exceeds the magnetization reverse temperature of the second magnetic layer 23 but does not reach that of the fourth magnetic layer 25, though the magnetizations of the first and the third magnetic layers 22, 24 are vanished, the sub-lattice magnetizing direction of the fourth magnetic layer 25 does not change. Since the temperature exceeds the compensation temperature of the second magnetic layer 23, the second magnetic layer 23 is TM rich. At magnetization reverse temperature of the second magnetic layer 23, the magnetizing direction of the second magnetic layer 23 is directed upward due to the magnetic field by an external magnet 28 without the exchange coupling force of the first and the third magnetic layer 22, 24, and furthermore, it is transferred onto the first magnetic layer 22, thereby the magnetizing direction of the first magnetic layer 22 is directed upward. By successively strengthening the exchange coupling forces between the first magnetic layer 22 and the second magnetic layer 23, the second magnetic layer 23 and the third magnetic layer 24 and the third magnetic layer 24 and the fourth magnetic layer 25, the sub-lattice magnetization of the third magnetic layer 24 aligns with that of the fourth magnetic layer 25 below the Curie temperature of the third magnetic layer 24, and when temperature drops further and the exchange coupling force becomes larger, the sub-lattice magnetization of the second magnetic layer 23 aligns with that of the fourth magnetic layer 25 via the third magnetic layer 24 and returns to the initial state.

By modulating only the laser light power according to the operation as stated above, the light modulation direct overwrite is made possible.

As described heretofore, in the present invention, by discriminating information showing whether or not an optical recording medium is the direct overwrite light modulation recording, in case of the light modulation recording, two kinds of light power used for recording, and in other case, the light power used for recording and reproducing are recorded on the control tracks, thereby the volume of area for recording thereof may be minimized.

Next, another invention will be described with reference to the drawings showing its embodiments.

Figure 4:
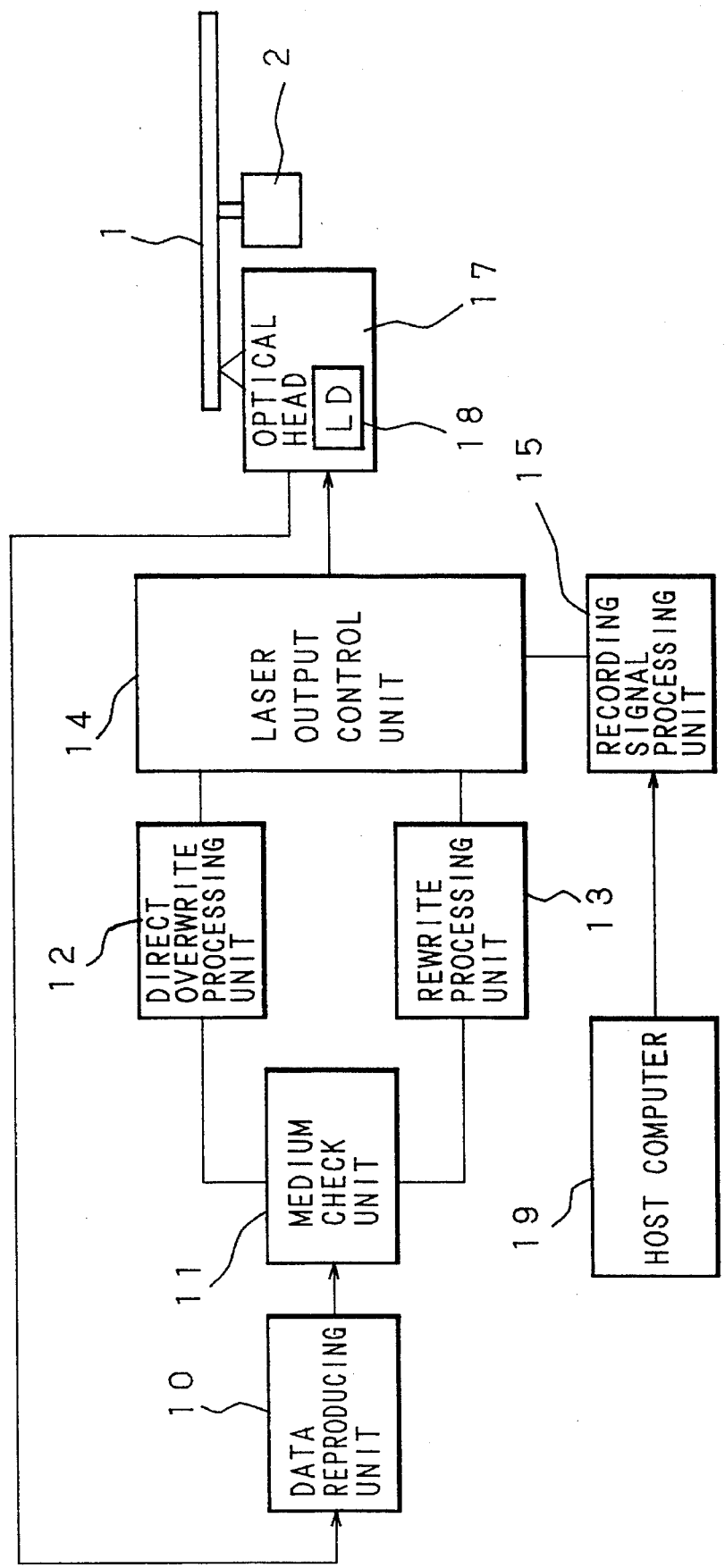
FIG. 4 is a block diagram showing a schematic configuration of an optical recording apparatus according to the present invention.

In FIG. 4, numeral 1 designates an optical-magnetic disc (hereinafter referred to as a disc), which is rotated at a constant speed by a motor 2. Facing the lower surface of the disc 1, an optical head 17 for recording and reproducing information is provided. The optical head 17 irradiates laser light emitted from a laser diode (hereinafter referred to as LD) 18 of a light source on the disc 1, and receives the reflected light therefrom, and irradiates laser light having higher intensity than the reflected light to heat the disc 1 for recording and erasing data.

The optical disc 1 has an area configuration as shown in FIG. 2.

Information read by the optical head 17 are given to a data reproducing unit 10, and demodulated therein. In the data reproducing unit 10, first, discriminating information in the phased encoded parts PEP1 to PEP3 are reproduced and the reproduced information are given to a medium check unit 11. Next, recording and reproducing conditions recorded in the standard format parts SFP1 to SFPn are reproduce and given to the medium check unit 11. The medium check unit 11 checks the medium in response to the reproduced result of the discriminating information, and in case the checked result shows that a medium is a direct overwrite light modulation recording medium, the medium check unit 11 enables the overwrite processing unit 12 to operate. The direct overwrite processing unit 12 sets two kinds of high and low light power levels used for recording in response to the recording conditions, and gives the set level to a laser output control unit 14. While, in case the checked result shows that a medium is not a direct overwrite light modulation recording medium, the medium check unit 11 enables a rewrite processing unit 13 set to operate. The rewrite processing unit 13 sets two kinds of light power level used for recording and erasing in response to the recording conditions, and gives the set level to the laser output control unit 14. The laser output control unit 14 is provided with the recording signal from a host computer 19 via a recording signal processing unit 15. The recording signal processing unit 15 adds error correcting codes to the recording signal given from the host computer, and gives the 2/7 modulated binary recording signal to the laser output control unit 14. In the case where the two kinds of light power level are given from the direct overwrite processing unit 12, the laser output control unit 14 output the laser modulation signal so that the LD 18 is luminesced by the two kinds of light power corresponding to the recording signals "1" and "0", and outputs the laser modulation signal which turns on and off in response to the recording signals "1" and "0", when the light power level is given from the rewrite processing unit 13. The LD 18 irradiates laser light controlled by the laser modulation signal on the disc 1 to heat it.

Figure 5:
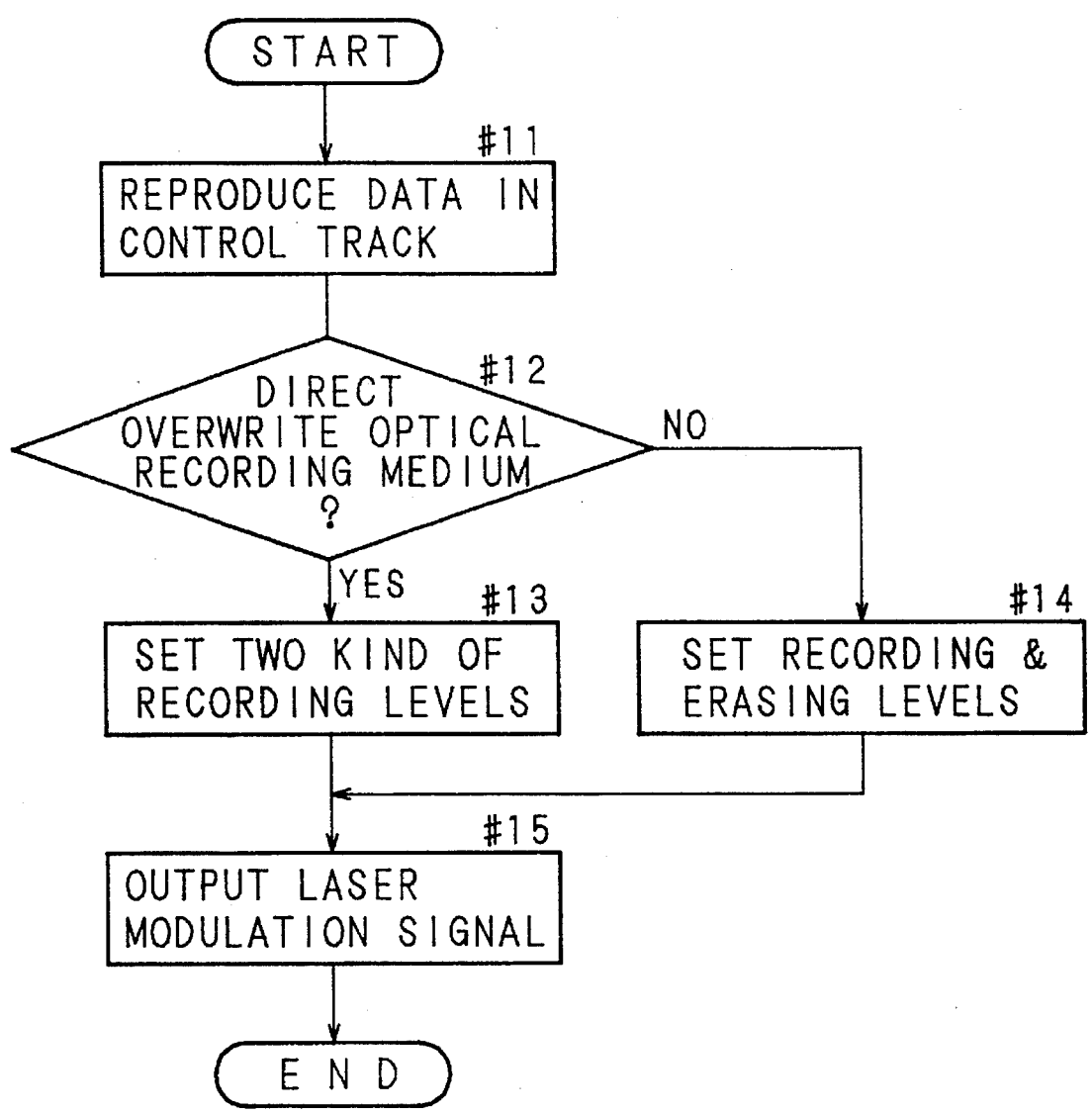
FIG. 5 is a flow chart showing contents of the recording processing.

FIG. 5 is a flow chart showing the content of recording processings by the apparatus of the present invention. First, the content of the control track (CT) is reproduced (Step #11), and in response to the discriminating information, it is judged whether or not an optical recording medium is the direct overwrite light modulation recording medium (Step #12), then in response to the judgment, two kinds of high and low recording levels or the recording and erasing levels are set (Steps #13, #14), and finally, according to those levels the laser modulation signal is outputted to control the LD 18 (Step #15).

By these processings, irrespective of the recording format of the disc 1, information can be recorded by one optical recording apparatus.

As described above, according to another invention, the kind of medium is judged by discriminating information in the control track recorded in the optical recording medium, and according to the judgment, the light power level is set to record information, so the recording can be effected whether or not the medium is the direct overwrite light modulation recording medium, or irrespective of difference in the recording format.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. An optical recording system, comprising:

a medium having pre-recorded control tracks in which medium information including information related to two kinds of light power, and discriminating information which discriminates formats related to a recording method used with said optical recording medium, said optical recording medium having an initialization magnetic film;

a control magnetic film disposed on said initialization magnetic film, for controlling transmission of an exchange coupling force from said initialization magnetic film;

a first additional magnetic layer disposed on the control magnetic film;

a second additional magnetic layer disposed on the first additional magnetic layer; and said control tracks including discriminating information which shows whether said optical recording medium is a direct overwrite light modulation recording medium, that is recorded by two kinds of high and low power levels, said optical recording medium of a first type having information recorded thereon by a recording method using different light powers for recording and erasing respectively, the light powers used corresponding to the information related to two kinds of light power of said medium information, in the case where said discriminating information shows that the medium is not a direct overwrite light modulation recording medium, and said optical recording medium of a second type having information recorded thereon by a recording method using two different light power levels for the direct overwrite recording of the information recorded thereon, the light powers used corresponding to the information related to two kinds of light power of said medium information, in the case where said discriminating information shows that the medium is a direct overwrite light modulation recording medium; and an optical recording apparatus having means for reading the medium information;

means for judging the recording method corresponding to one of the first type and the second type of medium in accordance with the medium information read by the means for reading;

means for setting the light power level for the recording method judged by the means for judging, in accordance with the medium information read by the means for reading;

means responsive to the means for setting, for overwriting information in the optical recording medium using the light power level and the recording method set by the means for setting.

2. An optical recording medium as set forth in claim 1, wherein said control tracks include phased encoded parts and standard format parts:

the phase encoded parts including the discriminating information, recorded without track grooves; and the standard format parts, including recording and reproducing conditions recorded with track grooves.

3. An optical recording medium as set forth in claim 1, said optical recording medium of a direct overwrite light modulation recording type, wherein said first additional magnetic layer has a vertical magnetic anisotropy, and said second additional magnetic layer provided on said first additional magnetic layer is coupled therewith by an exchange coupling force.

4. An optical recording medium as set forth in claim 1, said optical recording medium of a direct overwrite modulation recording type, wherein said initialization magnetic film has a vertical magnetic anisotropy, said control magnetic film provided on said initialization magnetic film is coupled therewith by an exchange coupling force, said first additional magnetic layer provided on said control magnetic film is coupled therewith by an exchange coupling force and said second additional magnetic layer provided on said first additional magnetic layer is coupled therewith by an exchange coupling force.

5. An optical recording apparatus which records information in an optical recording medium, in which discriminating information showing whether or not said optical recording medium is direct overwrite light modulation recording that is recorded by two kinds of light power level, and recording conditions including the light power level for the recording are recorded, and in the case where the discriminating information shows that it is not the direct overwrite light modulation recording, respective light powers used for recording and erasing are recorded as the recording condition, and in the case where the discriminating information shows that it is the direct overwrite light modulation recording, two kinds of light power level used for the direct overwrite light modulation recording are recorded as the recording condition, comprising, means for reading the discriminating information and recording conditions;

means for judging whether the optical recording medium is the direct overwrite light modulation recording or not, in response to the discriminating information read by said means;

means for setting a light power level used for erasing when the means for judging judges the medium not to be of the direct overwrite modulation recording type, and for recording when the means for judging judges the medium to be of the direct overwrite modulation recording type; and means for erasing when the means for judging judges the medium not to be of the direct overwrite light modulation recording type, and for recording the information when the means for judging judges the medium to be of the direct overwrite light modulation recording type, the erasing and recording being performed at the light power level set by said setting means.

6. An optical recording medium having at least one pre-recorded control track in which medium information including information related to two kinds of light power, and discriminating information which discriminates a plurality of recording methods, by which said optical recording medium are recorded, said optical recording medium comprising:

an initialization magnetic film;

a control magnetic film disposed on said initialization magnetic film, for controlling transmission of an exchange coupling force from said initialization magnetic film;

a first additional magnetic layer disposed on the control magnetic film;

a second additional magnetic layer disposed on the first additional magnetic layer; and said control track including discriminating information which shows whether said optical recording medium is a direct overwrite light modulation recording medium, that is recorded by two kinds of high and low power levels, and wherein said optical recording medium is written by an apparatus using two different light powers for recording and erasing, respectively, the light powers used corresponding to the information related to two kinds of light power of said medium information, when said discriminating information shows that it is not a direct overwrite light modulation recording medium, and further wherein said optical recording medium is written by an apparatus using two different light power levels for the direct overwrite recording of the information recorded thereon, the light powers used corresponding to the information related to two kinds of light power of said medium information, when said discriminating information shows that it is a direct overwrite light modulation recording medium, and wherein in said direct overwrite modulation recording medium said initialization magnetic film has a vertical magnetic anisotropy, said control magnetic film provided on said initialization magnetic film is coupled therewith by an exchange coupling force, said first additional magnetic layer provided on said control magnetic film is coupled therewith by an exchange coupling force and said second additional magnetic layer provided on said first additional magnetic layer is coupled therewith by an exchange coupling force.

7. An optical recording apparatus for overwriting information in an optical recording medium of a first type and for overwriting information in an optical recording medium of a second type, each optical recording medium including medium information recorded thereon, the medium information indicating a recording method corresponding to one of the first type and the second type and a light power level, the apparatus comprising:

means for reading the medium information;

means for judging the recording method corresponding to one of the first type and the second type in accordance with the medium information read by the means for reading;

means for setting the light power level for the recording method judged in accordance with the medium information read by the means for reading;

means for overwriting information in the optical recording medium using the light power level for the recording method judged set by the means for setting.

8. An optical recording apparatus as claimed in claim 7, the medium information indicating the recording method of the medium recorded in a phase encoded format and the medium information indicating the light power level recorded in a standard format, wherein the means for reading further includes:

means for decoding the phase encoded format and outputting the medium information to the means for judging; and means for decoding the standard format and outputting the light power level to the means for setting.

9. An optical recording apparatus as claimed in claim 7, wherein the means for overwriting information further includes:

means for performing direct overwrite using two distinct light power levels, at least one light power level set by the means for setting.

10. An optical recording apparatus as claimed in claim 7, wherein the means for overwriting information further includes:

means for performing overwrite by separate recording and erasing using a record light power level and an erase light power level, at least the erase light power level set by the means for setting.

11. An optical recording apparatus which records information in an optical recording medium on which discriminating information is recorded showing whether or not said optical recording medium is recorded using a direct overwrite light modulation recording method using two kinds of light power level, and when the discriminating information shows that the optical recording medium is not recorded using the direct overwrite light modulation recording method, then there is a recorded a recording condition including respective light powers used for recording and erasing, and when the discriminating information shows that the optical recording medium is recorded using the direct overwrite light modulation recording method, then there is recorded a recording condition including the two kinds of light power level used for direct overwrite light modulation, the apparatus comprising:

means for reading the discriminating information and the recording condition;

means for receiving the discriminating information and the recording condition, and for judging whether the optical recording medium is recorded using direct overwrite light modulation, in response to the discriminating information read by said means for reading;

means for setting light power levels for the recording method judged in accordance with the recording condition received by the means for judging; and means for erasing when the means for judging judges the medium not to be recorded using direct overwrite light modulation, and for recording the information when the means for judging judges the medium to be recorded using direct overwrite light modulation, the erasing and recording being performed at the light power levels set by said setting means.

* * * * *